United States Statutory Invention Registration [19]

[11] Reg. Number: H302

Nevitt et al. [43] Published: Jul. 7, 1987

[54] CERAMICS CONTAINING DISPERSANTS FOR IMPROVED FRACTURE TOUGHNESS

[75] Inventors: Michael V. Nevitt; Anthony T. Aldred, both of Wheaton; Sai-Kit Chan, Darien, all of Ill.

[73] Assignee: The United States of America as represented by the United States Department of Energy, Washington, D.C.

[21] Appl. No.: 750,122

[22] Filed: Jul. 1, 1985

[51] Int. Cl.[4] ..... C04B 35/10; C04B 35/04; C04B 35/18; C04B 35/50

[52] U.S. Cl. ..... 501/103; 501/104; 501/105; 501/108; 501/127; 501/134; 501/153

[58] Field of Search ..... 501/127, 103, 104, 105, 501/108, 153, 134

[56] References Cited

U.S. PATENT DOCUMENTS

| | | | |
|---|---|---|---|
| 2,040,215 | 5/1936 | Rava | 501/103 X |
| 3,287,143 | 11/1966 | Yavorsky | 501/127 X |
| 4,303,447 | 12/1981 | Buchanan et al. | 501/105 X |
| 4,406,699 | 9/1983 | Beck et al. | 501/104 X |
| 4,507,394 | 3/1985 | Mase et al. | 501/103 X |

FOREIGN PATENT DOCUMENTS

| | | | |
|---|---|---|---|
| 152266 | 8/1984 | Japan | 501/103 |

OTHER PUBLICATIONS

Stevens and Evans, "Transformation Toughening by Dispersed Polycrystalline Zirconia", Br. Ceram. Trans. J., 83, 28–31 (1984).

*Primary Examiner*—John F. Terapane
*Assistant Examiner*—M. L. Mallon
*Attorney, Agent, or Firm*—William Lohff; James W. Weinberger; Judson R. Hightower

[57] ABSTRACT

The invention is a ceramic composition containing a new class of dispersant for hindering crack propagation by means of one or more energy-dissipative mechanisms. The composition is composed of a ceramic matrix with dispersed particles of a transformation-prone rare-earth niobate, tantalate or mixtures of these with each other and/or with a rare-earth vanadate. The dispersants, having a generic composition $tRMO_4$, where R is a rare-earth element, B is Nb or Ta and O is oxygen, are mixed in powder form with a powder of the matrix ceramic and sintered to produce a ceramic form or body. The crack-hindering mechanisms operates to provide improved performance over a wide range of temperature and operating conditions.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CERAMICS CONTAINING DISPERSANTS FOR IMPROVED FRACTURE TOUGHNESS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to new ceramic compositions with useful properties extending into high temperature ranges of 800° C. and above and more particularly to ceramic compositions containing in dispersed form an additive class which absorbs stress-related energies transmitted in the composition. These additives may be characterized as transformation-prone rare-earth niobates, tantalates or mixtures of these with each other and/or mixtures with rare-earth vanadates. The dispersant is incorporated as small particles in a ceramic matrix in order to attenuate or hinder the propagation in the matrix of cracks that arise from stress.

Ceramics have been proposed as replacements for metals in a number of important products including those for high temperature use such as turbine blades, cylinder liners and heads for internal combustion engines, connecting rods, and the like. Ceramics have also been used as liners in various industrial processing equipment including equipment for coal gasification.

Ceramics in general are composed of hard brittle materials such as $Al_2O_3$, $ZrO_2$, MgO and mixtures of oxides such as mullite ($Al_2O_3$ and $SiO_2$) As small particles, these materials are mixed with sintering aids and sintered at elevated temperatures to cause the particles to adhere together in the desired shape. Stresses in these materials caused by temperature variations and/or mechanical loads limit the performance of the ceramics. Excessive stresses cause cracks to form and grow across the structural shapes. In some instances, these cracks may travel at or near the speed of sound and are not effectively hindered nor blocked.

Some additives have been incorporated into ceramic compositions to reduce the effect of stresses on performance. One of these involves the addition of an alloying ingredient (CaO is typical) to $ZrO_2$ in order to achieve a structure in which the matrix consisting of the cubic form of $ZrO_2$ contains as a dispersant fine particles of the tetragonal form of $ZrO_2$. Another involves adding $ZrO_2$, wholly or partially in the tetragonal form, to $Al_2O_3$ or mullite. The principal mechanism believed to be associated with the beneficial effect of both of these additives involves the action of an advancing crack in producing a stress-induced transformation of the tetragonal form of $ZrO_2$ to the monoclinic form with a resultant volume change. A change in the free energy of the system occurs and, as a consequence, there is an attenuation of crack progression. Further details are provided in the article "Transformation Toughening by Dispersed Polycrystalline Zirconia" by R. Stevens and P. A. Evans, Br. Ceram. Trans. J., 83, 28–31 (1984).

While the effect of a tetragonal $ZrO_2$ dispersant in a cubic $ZrO_2$ matrix or in an $Al_2O_3$ or mullite matrix has interesting results, this approach is limited in its upper operating temperature. This is because the tetragonal form of the $ZrO_2$ dispersant necessary for the beneficial effect cannot be retained above about 800° C. Moreover, it appears that the tetragonal $ZrO_2$ dispersant functions only by the volume-change effect of the transformation.

Still another limitation in the use of tetragonal $ZrO_2$ as a dispersant at lower temperature as well as higher temperature is the need for a complex, difficult-to-control interplay of additive composition thermal treatment and dispersant particle size that is difficult to manipulate in achieving satisfactory level of crack attenuation. When higher operating temperatures of 800° C. to 1200° C. are required for ceramics; and/or when additional crack-attenuating functions are sought and/or when better crack-attenuation control is required at any operating temperature: other dispersant additives would be desirable.

Accordingly, one object of the invention is an additive system to improve crack attenuation at higher temperatures in ceramics. Another object of the invention is an additive system which acts as an energy absorber through one and preferably more than one mechanism. An additional object of the invention is an additive system which provides a range of additives useful, effective and controllable under different temperature conditions and in different ceramics. A further object of the invention is an additive system combining two or more of the above objects. These and other objects of the invention will become apparent from the following detailed invention.

SUMMARY OF THE INVENTION

Briefly, the invention is directed to a ceramic composition particularly useful at temperatures above about 800° C. and comprising a ceramic matrix and an additive system based on a transformation-prone rare-earth niobate, tantalate or mixtures of these with each other and/or with a rare-earth vanadate. The general formula for these additives is $tRMO_4$ where R is a rare earth element with an atomic number in the range of 57–71 and M is Nb or Ta or mixtures, with or without substitution of V, as for example, $LaNb_{0.8}V_{0.2}O_4$. The prefix t denotes that the dispersant particles are retained in a tetragonal crystal form at an ambient, working temperature 100°–200° C. below the temperature at which the tetragonal form would exist in a bulk sample of $RMO_4$. The method of achieving this retention is an essential part of the invention, as will be described. These additives, when dispersed as small particles in a ceramic mixture, undergo in the temperature range 800°–1200° C., a stress-induced transformations to a monoclinic form and thereby impart the same crack-attenuating mechanism over this higher temperature range that $tZrO_2$ provides only at 800° C. and below.

These new dispersants also in general have the capacity to provide other mechanisms for hindering crack propagation. One of these is the stress-induced motion of domain walls that occur concurrently with the transformation. This additional energy-dissipative mechanism accompanying crack impingement can slow down and ultimately halt crack motion. Another mechanism lies in the low inherent sonic velocity that is a characteristic of the $tRMO_4$ dispersant. The velocity of crack propagation at sonic or near-sonic levels through a $tRMO_4$ dispersant particle should be attenuated by as much as 50% relative to the velocity in a matrix such as $Al_2O_3$, leading to a dissipative "out-of-step", noncooperative crack movement. All of the foregoing crack-hindering mechanisms can operate collectively and interactively in a $tRMO_4$ dispersant, thus providing advantages with respect to other dispersants.

DETAILED DESCRIPTION OF THE PREFERRED EMBODIMENT

The inventive ceramic composition comprises a ceramic matrix as a continuous phase with a hardness above about 800-1000 (Vickers diamond pyramid) and as a second component a tetragonal rare-earth niobate or tantalate or mixtures of these with each other and/or with a rare-earth vanadate. The second component is present in an amount below about 25 wt. % of the composition and dispersed in the matrix as particles sized below about 5 microns, the particles of the second component have a transition temperature depressed by about 100°-200° C. from the transition temperature of the component in its bulk form.

The additives may be identified by the formula $tRMO_4$ where R is a rare earth element with an atomic number of 57-71 and M is Nb or Ta or mixtures thereof with or without V additions. Advantageously, R has an atomic number of 57-71 when M is Nb (with or without V) and 60-71 when M is Ta. When M is Nb, the tetragonal phase transforms in a bulk sample between about 500°-800° C. depending on the rare-earth partner. When M is Ta, the tetragonal phase transforms in a bulk sample between about 1300°-1420° C. depending on the rare earth. Controlled changes in composition such as mixing niobates with tantalates or partially substituting V for Nb or Ta will permit the selection of a tetragonal transformation temperature optimized for a desired operating temperature of the ceramic body to which the dispersant is added. The tetragonal transformation temperature will be manipulated so that it will not occur at operating temperature in the absence of a crack-generated stress but will occur in the presence of such a stress, thus bringing into operation the crack-hindering mechanism previously described.

If the bulk transition temperature is $T_C$ and the depressed transition temperature is $T_D$ ($T_C > T_D$), then the operating temperature $T_{OP}$ is such that $T_C > T_{OP} > T_D$. For the preferred effect, $T_{OP}$ should be close to but always greater than $T_D$. By controlling the chemical composition of the dispersant material, $T_C$ can be varied between about 1400° C. and −100° C. with $T_D$ always lower than $T_C$ by about 100°-200° C. A maximum operating temperature based on $T_C$ being about 1400° C. would thus be about 1200° C.

Another means of manipulating the tetragonal transformation temperature, in addition to composition control lies in controlling the size of the dispersant particles and their surface condition: the transformation temperature decreases with decreasing particle size. The following is an illustrative example of these control processes. The compound $LaNbO_4$ undergoes the tetragonal transformation at 500° C. in a bulk sample. By a partial substitution of V for Nb ($LaNb_{0.8}V_{0.2}O_4$), the bulk-sample transformation is reduced to 95° C. By particle-size and surface-condition control, fine particles of the V-substituted compound can be made to undergo the tetragonal transformation at about −75° C. More generally, by changing the amount and nature of M (Ta, Nb, or partial replacement by V) $T_C$ can be varied from 1400° C. to −200° C. and ($T_C - T_D$) can be maintained at about 200° C. Thus by changing the chemical concentration of the dispersant, an operating range of temperature $T_C > T_{OP} > T_D$ can be obtained suitable for different products.

The following generic compositions may be utilized for a) and c) R = elements 39 and 60-71; b) R = elements being the operating temperature of the ceramic composition and/or the desired level of crack-attenuating properties.

a) R $Ta_{(1-x)}V_xO_4$ where $0 \leqq x \leqq 0.3$ b) R $Nb_{(1-x)}V_xO_4$ where $0 \leqq x \leqq 0.3$ c) R $Ta_{(1-x)}Nb_xO_4$ where $0 \leqq x \leqq 1.0$ for a) and c) R = elements 39 and 60-71; b) R = elementa 39 and 57-71.

Preferably for high temperature use, the dispersants contain Ta. These dispersant additives in general have a melting temperature above about 1600° C. and a bulk elastic modulus of $1\text{-}2 \times 10^{12}$ dynes $cm^{-2}$ which is typically one-half or less of those of the host materials. Illustrative dispersants are: $NdTa_{0.8}V_{0.2}O_4$; $YdTa_{0.9}V_{0.2}O_4$; $HoTa_{0.95}V_{0.05}O_4$; $YbTaO_4$; $LaNb_{0.95}V_{0.05}O_4$; $NdNb_{0.75}V_{0.25}O_4$; $TbNb_{0.80}V_{0.20}O_4$; $TmNbO_4$; $SmTa_{0.8}Nb_{0.2}O_4$; $DyTa_{0.6}Nb_{0.4}O_4$; $ErTa_{0.4}Nb_{0.6}O_4$; $YTa_{0.2}Nb_{0.8}O_4$. They are prepared by repetitive sintering of the requisite amounts of the component oxides ($R_2O_3$, $Ta_2O_5$, $Nb_2O_5$, $V_2O_5$) in air or air enriched with oxygen in the range 1200°-1600° C. to ensure chemical homogeniety. As an illustration, NdNb0 75V0.2504 is prepared by mixing Nd203 with Nb205 and V205 in the appropriate amounts in powder form with the mixture being sintered at 1400° C. in air for about 24 hours.

The host ceramic may be any one of the usual important oxides and preferably is $Al_2O_3$, $ZrO_2$, MgO or mixtures of $Al_2O_3$ and $SiO_2$ such as mullite. They are used in the preparation as particles sized below about 5 microns: the principal consideration being sinterability.

The dispersants are also used as small particles of 5 microns and below, advantageously preferably about 0.1-5 microns and preferably about 0.1-2 microns. The smaller particles tend to enhance the depressant effect on the bulk transition temperature and facilitate the generation of a uniform dispersant distribution.

Usually, the dispersants is incorporated into the ceramic in an amount less than about 25 wt. %. The lower limit is sufficient to enhance the desired performance of the ceramic composition. Advantageously, the range is about 3-25 wt. % and preferably about 8-15 wt. %.

Conventional state-of-the art ceramic preparation procedures are utilized for sintering the host materials. Particles of the matrix material, sized below about 5 microns are intimately mixed by ball milling with particles of the dispersant sized 0.1-5 microns. Sintering aids such as MgO or other conventional sintering aids may be added as necessary. The mixed powders are compressed into compacts of appropriate size and shape, and these are then sintered in air or in air enriched with oxygen between 1300° C. and 1600° C. for 10 hours or less.

The limitation as to upper sintering temperature is the melting point of the dispersant phase which usually ranges from 1600°-2000° C.

These new dispersants also in general have the capacity to provide other mechanisms for hindering crack propagation. One of these is the stress-induced motion of domain walls that occur concurrently with the transformation. This additional energy-dissipative mechanism accompanying crack impingement can slow down and ultimately halt crack motion. Another mechanism lies in the low inherent sonic velocity that is a characteristic of the $tRMO_4$ dispersant. The velocity of crack propagation at sonic or near-sonic levels through a $tRMO_4$ dispersant particle should be attenuated by as much as 50% relative to the velocity in a matrix such as $Al_2O_3$, leading to a dissipative "out-of-step", noncooperative crack movement. All of the foregoing crack-hindering mechanisms can operate collectively and interactively in a $tRMO_4$ dispersant, thus providing advantages with respect to other dispersants.

The embodiments of this invention in which an exclusive property or privilege is claimed are defined as follows:

1. A ceramic composition consisting essentially of a ceramic matrix of $Al_2O_3$, mullite, $ZrO_2$, MgO or mixtures thereof as a continuous phase with a hardness above about 800 and as a second component a tetragonal rare-earth niobate, tantalate or mixtures of these with each other and/or with a rare-earth vanadate, the second embodiment being present in an amount in the range of about 3–25 wt. % of the composition and dispersed in the matrix as particles sized below about 5 microns, the particles of the second component in the matrix having a transition temperature $T_D$ being below the transition temperature for the second component in bulk or $T_C$.

2. The ceramic composition of claim 1 wherein the second component has a depressed transition temperature $T_D$ above about 800° C. and below $T_C$ by at least about 100° C., a melting temperature above about 1600° and a hardness below about 500 (Vickers pyramid).

3. The ceramic composition of claim 1 wherein the second component has the formula $tRMO_4$ wherein R is a rare earth, M is Nb or Ta or mixtures thereof with or without V, and R has an atomic number in the range of 39 and 57–71 when M is Nb and 39 and 60–71 where M is Ta.

4. The ceramic composition of claim 3 wherein the second component has a depressed transition temperature above about 800° C., a melting temperature above about 1600° C., and a hardness below about 500.

5. The ceramic composition of claim 5 wherein the second component has a stress-free transition temperature between 800° and 1200° C. and is present in the amount of about 8–15 wt. %.

6. The ceramic composition of claim 5 wherein the particles of the second component are sized in the range of about 0.1–2 microns.

7. The ceramic composition of claim 5 wherein R is Ho and M is Ta.

8. The ceramic composition of claim 5 wherein R is Nd and M is Ta.

9. The ceramic composition of claim 5 wherein R is Nd and M is $Nb_{0.6}Ta_{0.4}$.

10. The ceramic composition of claim 5 wherein R is Nd and M is $Ta_{0.8}V_{0.2}$.

* * * * *